US010975847B1

(12) United States Patent
Schulten

(10) Patent No.: US 10,975,847 B1
(45) Date of Patent: Apr. 13, 2021

(54) SYSTEM AND METHOD FOR FARM-LEVEL CONTROL OF TRANSIENT POWER BOOST DURING FREQUENCY EVENTS

(71) Applicant: General Electric Company, Schenectady, NY (US)

(72) Inventor: Christoph Schulten, Salzbergen (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/677,820

(22) Filed: Nov. 8, 2019

(51) Int. Cl.
*F03D 7/04* (2006.01)
*F03D 7/02* (2006.01)
*H02J 3/38* (2006.01)

(52) U.S. Cl.
CPC ........... *F03D 7/048* (2013.01); *F03D 7/0272* (2013.01); *F03D 7/0284* (2013.01); *H02J 3/386* (2013.01)

(58) Field of Classification Search
CPC ...... F03D 7/048; F03D 7/0272; F03D 7/0284; H02J 3/386
USPC .......................... 290/44, 55; 307/82; 700/287
See application file for complete search history.

(56) References Cited

U.S. PATENT DOCUMENTS

| | | | | |
|---|---|---|---|---|
| 7,613,548 B2* | 11/2009 | Cardinal | ................. | F03D 7/048 700/286 |
| 7,679,215 B2* | 3/2010 | Delmerico | .............. | H02J 3/381 307/57 |
| 8,046,110 B2* | 10/2011 | Mayor | ..................... | H02J 3/386 700/297 |
| 8,095,244 B2* | 1/2012 | Morjaria | ................. | F03D 7/048 700/287 |
| 8,150,641 B2* | 4/2012 | Morjaria | ................. | F03D 7/028 702/60 |
| 8,237,301 B2* | 8/2012 | Delmerico | ............ | F03D 7/0284 290/44 |
| 8,853,877 B1* | 10/2014 | Zalar | ....................... | F03D 7/048 290/44 |
| 9,115,695 B2* | 8/2015 | Bech | ..................... | F03D 7/0284 |
| 9,350,166 B2* | 5/2016 | Fishman | ................... | H02J 1/00 |
| 9,473,057 B2* | 10/2016 | Burra | ........................ | H02P 9/00 |
| 10,014,689 B2* | 7/2018 | Sun | ............................. | H02J 3/00 |
| 10,050,447 B2* | 8/2018 | Burra | ................... | H02J 13/0086 |
| 10,415,545 B2* | 9/2019 | Kjær et al. | ............. | G05B 15/02 |
| 10,731,632 B2* | 8/2020 | Hovgaard | ............. | F03D 7/0224 |
| 10,731,633 B2* | 8/2020 | Ayiranazhi Cailakam | ................. | F03D 7/0284 |
| 10,855,078 B2* | 12/2020 | Rosendahl | ................ | H02J 3/18 |

(Continued)

*Primary Examiner* — Pedro J Cuevas
(74) *Attorney, Agent, or Firm* — Dority & Manning, P.A.

(57) ABSTRACT

A method for controlling a wind farm connected to an electrical grid includes receiving, via a farm-level controller, a frequency signal from the electrical grid. If the frequency signal is indicative of a frequency event occurring in the electrical grid, the method includes implementing, via the farm-level controller, a control scheme for providing frequency regulation and power-swing stabilization for the electrical grid. For example, the control scheme includes receiving, via the farm-level controller, individual output boost capabilities from each of the plurality of wind turbine generators, calculating, via the farm-level controller, a power command based on the individual output boost capabilities and based on one or more grid code requirements of the electrical grid, distributing, via the farm-level controller, the power command to each of the wind turbine generators.

16 Claims, 6 Drawing Sheets

(56) References Cited

U.S. PATENT DOCUMENTS

| | | | |
|---|---|---|---|
| 2009/0194995 A1* | 8/2009 | Delmerico | H02P 9/04 290/44 |
| 2009/0281675 A1* | 11/2009 | Rasmussen | F03D 7/047 700/287 |
| 2009/0283129 A1* | 11/2009 | Foss | H02M 7/493 136/244 |
| 2010/0115951 A1* | 5/2010 | Pedersen | F03D 7/048 60/698 |
| 2011/0144816 A1* | 6/2011 | Morjaria | F03D 7/048 700/287 |
| 2012/0104753 A1* | 5/2012 | Nakashima | F03D 7/048 290/44 |
| 2012/0175962 A1* | 7/2012 | Zhan | H02J 3/386 307/82 |
| 2012/0256422 A1* | 10/2012 | Fradella | H02K 21/24 290/55 |
| 2012/0300510 A1* | 11/2012 | Jensen | H02J 3/36 363/35 |
| 2013/0214537 A1* | 8/2013 | Hashimoto | F03D 15/00 290/55 |
| 2013/0221676 A1* | 8/2013 | Caldwell | F03D 9/28 290/55 |
| 2013/0249300 A1* | 9/2013 | Fishman | H01L 31/02021 307/82 |
| 2013/0257051 A1* | 10/2013 | Spruce | F03D 7/048 290/44 |
| 2014/0070534 A1* | 3/2014 | Hamano | F03D 15/00 290/43 |
| 2014/0103655 A1* | 4/2014 | Burra | F03D 7/028 290/44 |
| 2015/0021912 A1* | 1/2015 | Bech | F03D 7/0284 290/44 |
| 2015/0184550 A1* | 7/2015 | Wichmann | F01K 13/02 700/287 |
| 2015/0275862 A1* | 10/2015 | Babazadeh | H02J 3/386 290/44 |
| 2016/0285270 A1* | 9/2016 | Sun | H02J 3/00 |
| 2017/0051723 A1* | 2/2017 | KJ R | F03D 7/0284 |
| 2017/0089325 A1* | 3/2017 | Timbus | F03D 7/0292 |
| 2018/0335020 A1* | 11/2018 | Ayiranazhi Cailakam | F03D 17/00 |
| 2019/0048852 A1* | 2/2019 | KJ R | F03D 7/0284 |
| 2019/0170120 A1* | 6/2019 | Hald | F03D 9/257 |
| 2020/0076193 A1* | 3/2020 | Biris | F03D 9/255 |
| 2020/0280193 A1* | 9/2020 | Sachs | H02J 3/382 |

\* cited by examiner

SYSTEM AND METHOD FOR FARM-LEVEL CONTROL OF TRANSIENT POWER BOOST DURING FREQUENCY EVENTS

FIELD

The present disclosure relates generally to wind farms having a plurality of wind turbines, and more particular to systems and methods for farm-level control of transient power boost during grid frequency events.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity. In addition, a plurality of the wind turbines may be arranged in a predetermined geological location and electrically connected together to form a wind farm.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. As such, typical wind turbines also include various electrical components for converting the mechanical energy to electrical power. For example, the high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to an electrical grid via a grid breaker. Thus, the turbine transformer steps up the voltage amplitude of the electrical power such that the transformed electrical power may be further transmitted to the electrical grid.

Moreover, in many instances, a plurality of wind turbines may be arranged in a common geographical location referred to as a wind farm. Wind turbines and wind farms are typically designed to deliver power to the utility system with the power being independent of system frequency. Some wind turbine generators have a variable frequency operation and require a variable frequency power electronic inverter to interface the wind turbine generator output with the utility grid. In one common approach, the wind turbine generator output is directly fed to a power electronic converter, where the turbine frequency is rectified and inverted into a fixed frequency as needed by the utility system. An alternative approach uses a doubly fed asynchronous generator (DFAG) with a variable frequency power electronic inverter exciting the DFAG rotor and stator windings being coupled directly to the utility system.

In traditional power systems, the frequency of the synchronous generators of the power system matches the utility system and the dynamic response of the frequency of the utility system is dependent upon the inertia of the synchronous generators and loads. Synchronous generators used in traditional power systems are able to contribute in frequency and voltage control of the power system during transient conditions, that is, sudden failure of generation, line fault or connection of a large load. During such transient conditions, the system frequency starts to change at a rate mainly determined by the total angular momentum of the system, which is a sum of the angular moment of all the generators and rotating loads connected to the power system. In such transient conditions, the synchronous generators may also provide additional control services that modulate active power to stabilize the power system and restore frequency to its nominal value.

For larger wind farms or high penetration scenarios, however, the power being independent of system frequency may adversely affect power system frequency. In addition, it is common for turbine controllers to freeze or hold the power set point during a frequency event and to block external commands. As a result, some system operators are now requiring the wind farms, in addition the individual wind turbines, to provide enhanced capabilities, such as transient power boost during under frequency dips to more intelligently participate in frequency regulation and power-swing stabilization for the utility system.

Therefore, a system and method for farm-level control of transient power boost during grid frequency events would be welcomed in the art.

BRIEF DESCRIPTION

Aspects and advantages of the invention will be set forth in part in the following description, or may be obvious from the description, or may be learned through practice of the invention In one aspect, the present disclosure is directed to a method for controlling a wind farm connected to an electrical grid. The wind farm includes a plurality of wind turbine generators at least some having output boosting capabilities. The method includes receiving, via a farm-level controller, a frequency signal from the electrical grid. If the frequency signal is indicative of a frequency event occurring in the electrical grid, the method includes implementing, via the farm-level controller, a control scheme for providing frequency regulation and power-swing stabilization for the electrical grid. The control scheme includes receiving, via the farm-level controller, individual output boost capabilities from each of the plurality of wind turbine generators, calculating, via the farm-level controller, a power command based on the individual output boost capabilities and based on one or more grid code requirements of the electrical grid, distributing, via the farm-level controller, the power command to each of the wind turbine generators.

In an embodiment, the control scheme may include instructing, via the farm-level controller, one or more of the plurality of wind turbine generators to determine their respective individual output boost capabilities. More specifically, in such embodiments, the wind turbine generator(s) may determine their respective individual output boost capabilities based on at least one of rotor speed, generator speed, wind speed, actual power, power margin, torque margin, speed margin, or functions thereof.

In another embodiment, the frequency event may be, for example, the frequency signal being below a predetermined threshold.

In further embodiments, the power command may include, for example, increasing the power of one or more of the wind turbine generators, adjusting a power ramp up time or rate of one or more of the wind turbine generators, adjusting a power hold time of one or more of the wind turbine generators, or adjusting a power ramp down time or rate of one or more of the wind turbine generators.

In several embodiments, the control scheme may include ensuring, via the farm-level controller, a maximum power limit for the wind farm is not exceeded. For example, in such embodiments, ensuring the maximum power limit for the wind farm is not exceeded may include determining a minimum value between a power reference and a possible power for the wind farm, subtracting the minimum value from the maximum power limit for the wind farm to determine a power margin, and applying, via the farm-level controller, the power margin to the power command.

In additional embodiments, distributing the power command to each of the wind turbine generators may include distributing the power command to each of the wind turbine generators via a ramp block of the farm-level controller.

In particular embodiments, distributing the power command to each of the wind turbine generators may include adding the power command to an actual power of the wind farm at a start of the frequency event or continuously to a curtailed power of the wind farm so as to allow for combined power responses.

In another embodiment, distributing the power command to each of the wind turbine generators may include commanding selected ones of the plurality of wind turbine generators to boost their output to a desired level within their respective individual output boost capabilities.

In another aspect, the present disclosure is directed to a wind farm for connecting to an electrical grid. The wind farm includes a plurality of wind turbine generators, at least some of which have output boosting capabilities. Further, each generator has a power output providing a portion of a wind farm power output. The wind farm also includes a plurality of turbine controllers, each being associated with a respective wind turbine generator of the plurality of wind turbine generators. The wind farm also includes a farm-level controller communicatively coupled to each of the turbine controllers. The farm-lever controller is configured to perform a plurality of operations, including but not limited to receiving the frequency signal from the electrical grid and if the frequency signal is indicative of a frequency event occurring in the electrical grid, implementing a control scheme for providing frequency regulation and power-swing stabilization for the electrical grid. More specifically, the control scheme includes receiving individual output boost capabilities from each of the plurality of wind turbine generators, calculating a power command based on the individual output boost capabilities, and based on one or more grid code requirements of the electrical grid, distributing the power command to each of the wind turbine generators. It should also be understood that the system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
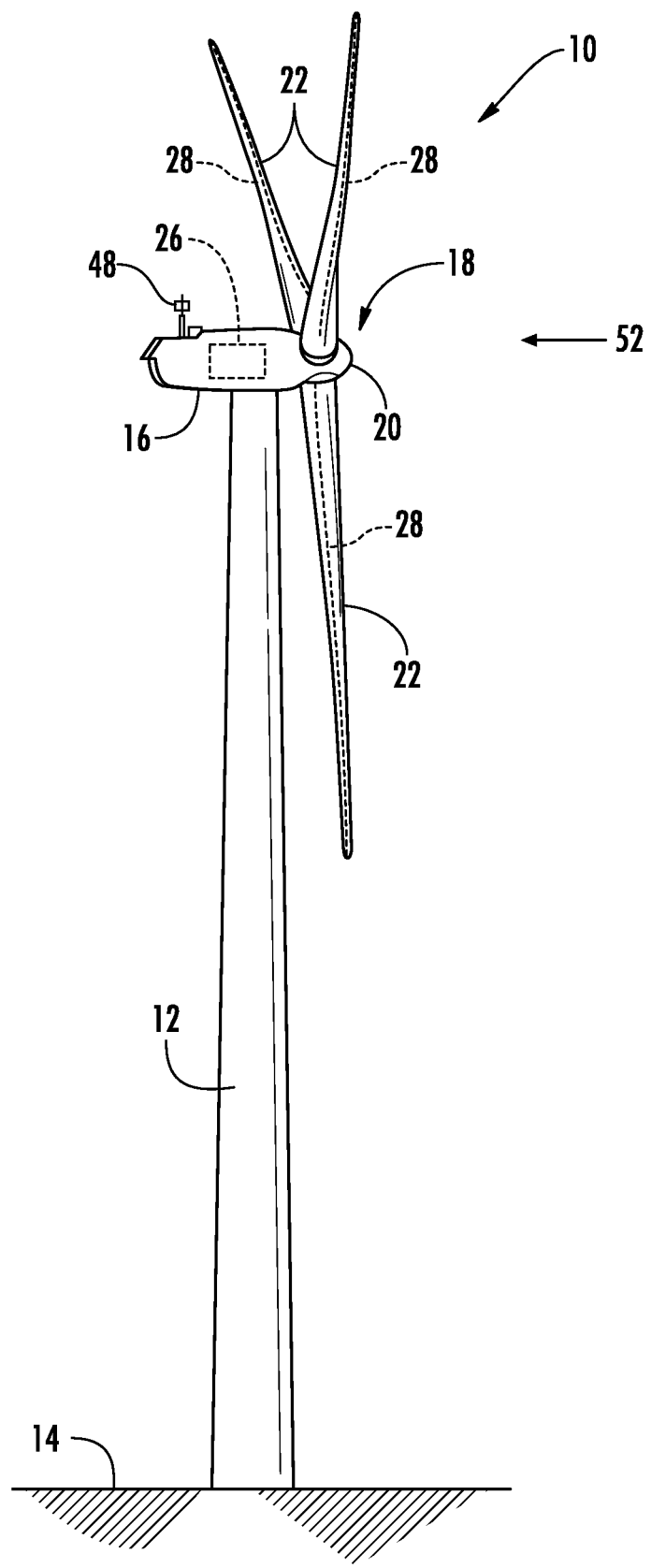
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
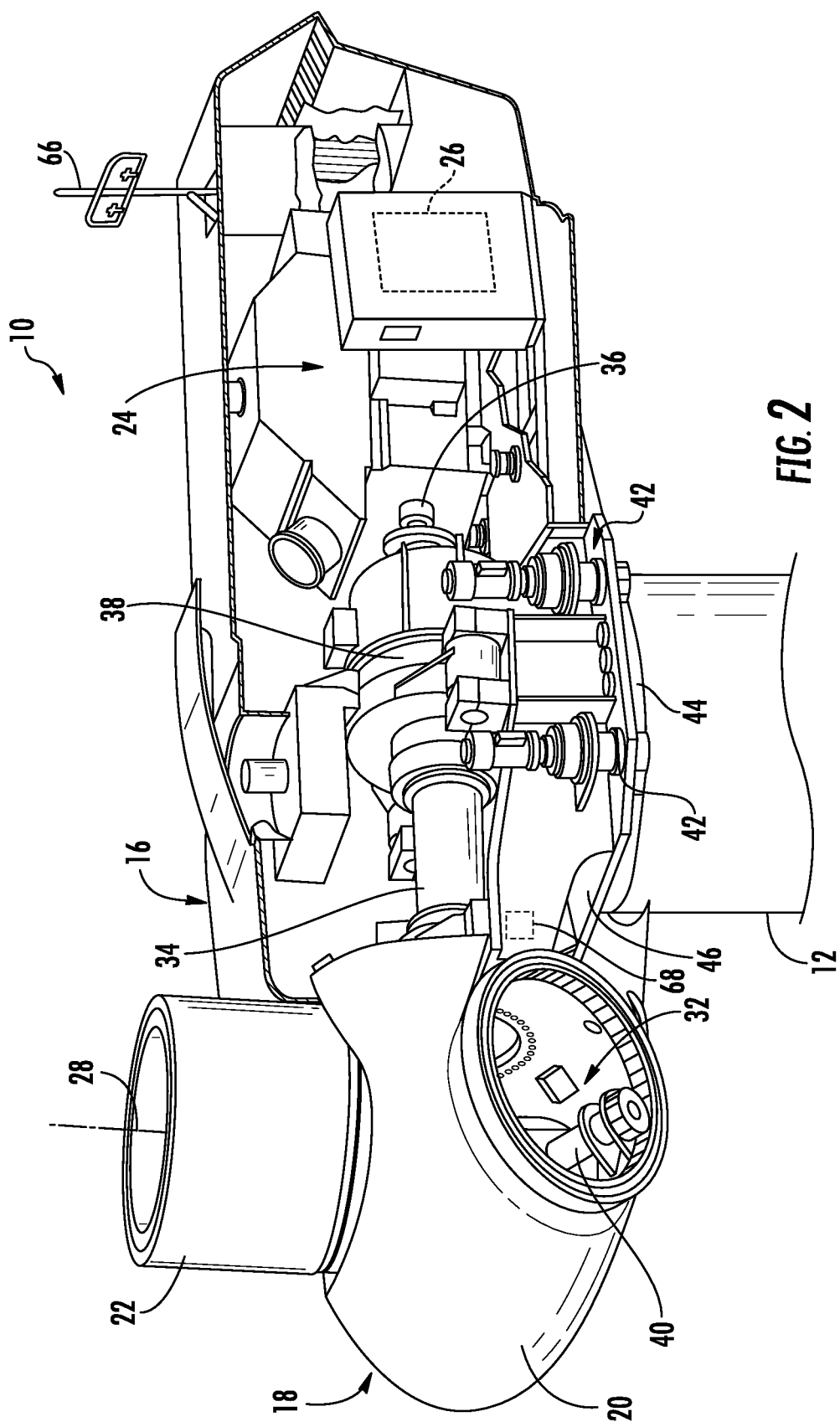
FIG. 2 illustrates a simplified, internal view of one embodiment of a nacelle according to the present disclosure.

Referring now to FIG. 2, a simplified, internal view of one embodiment of the nacelle 16 of the wind turbine 10 shown in FIG. 1 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 3:
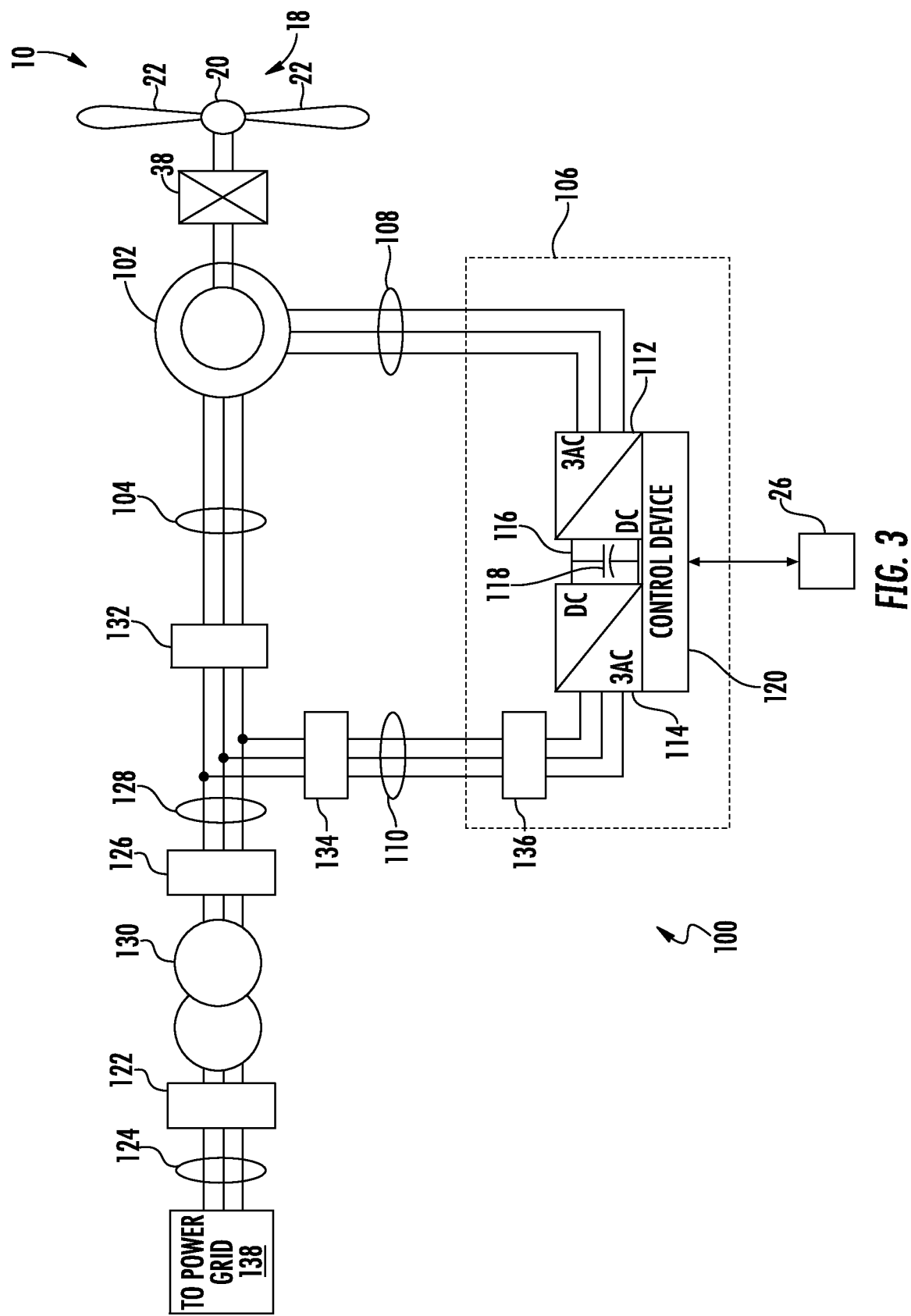
FIG. 3 illustrates a schematic view of one embodiment of a wind turbine electrical power system suitable for use with the wind turbine shown in FIG. 1.

Referring now to FIG. 3, a schematic diagram of one embodiment of a wind turbine power system 100 is illustrated in accordance with aspects of the present disclosure. Although the present disclosure will generally be described herein with reference to the system 100 shown in FIG. 3, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 3 and as mentioned, the rotor 18 of the wind turbine 10 (FIG. 1) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g. three-phase power) from a stator of the DFIG 102, and the rotor bus 108 may provide an output multiphase power (e.g. three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices, such as those described in FIG. 5.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g. three-phase) alternating current (AC) power is provided to the power converter 106. The rotor side power converter 112 converts the AC power provided from the rotor bus 108 into direct current (DC) power and provides the DC power to the DC link 116. As is generally understood, switching elements (e.g. IGBTs) used in the bridge circuits of the rotor side power converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g. IGBTs) used in bridge circuits of the line side power converter 114 can be modulated to convert the DC power on the DC link 116 into AC power on the line side bus 110. The AC power from the power converter 106 can be combined with the power from the stator of DFIG 102 to provide multi-phase power (e.g. three-phase power) having a frequency maintained substantially at the frequency of the electrical grid 124 (e.g. 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g. three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 4:
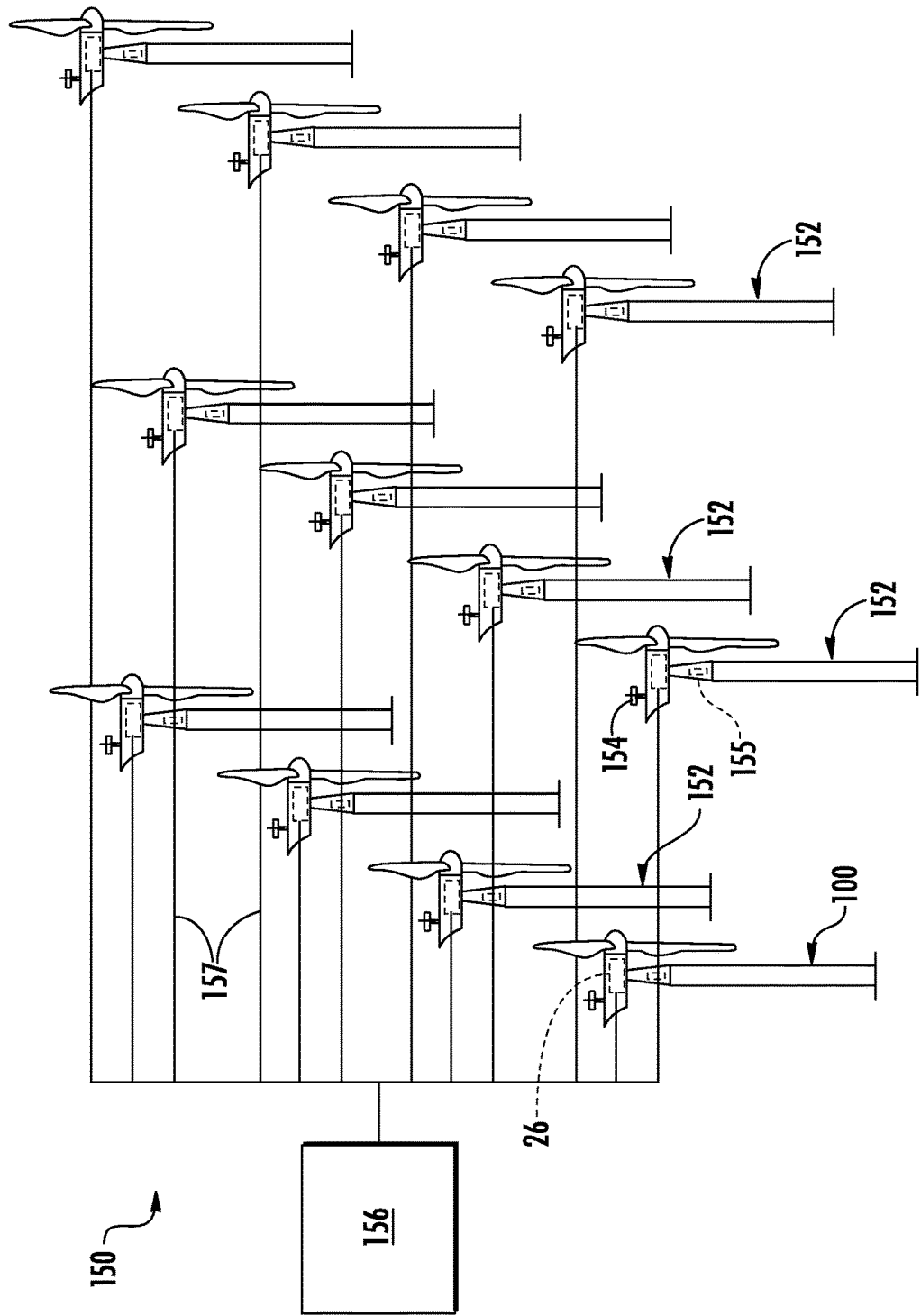
FIG. 4 illustrates a wind farm having a plurality of wind turbines according to the present disclosure.

Referring now to FIG. 4, the wind turbine power system 100 described herein may be part of a wind farm 150. As shown, the wind farm 150 may include a plurality of wind turbines 152, including the wind turbine power system 100 described above, and an overall farm-level controller 156. Thus, it should be understood that each of the wind turbine power systems includes a wind turbine generator, similar to generator 102, with at least some of the generators having power output boosting capabilities.

For example, as shown in the illustrated embodiment, the wind farm 150 includes twelve wind turbines, including wind turbine power system 100. However, in other embodiments, the wind farm 150 may include any other number of wind turbines, such as less than twelve wind turbines or greater than twelve wind turbines. In one embodiment, the turbine controllers of the plurality of wind turbines 152 are communicatively coupled to the farm-level controller 156, e.g. through a wired connection, such as by connecting the turbine controller 26 through suitable communicative links 157 (e.g., a suitable cable). Alternatively, the turbine controllers may be communicatively coupled to the farm-level controller 156 through a wireless connection, such as by using any suitable wireless communications protocol known in the art. In further embodiments, the farm-level controller 156 is configured to send and receive control signals to and from the various wind turbines 152, such as for example, distributing real and/or reactive power demands across the wind turbines 152 of the wind farm 150.

Figure 5:
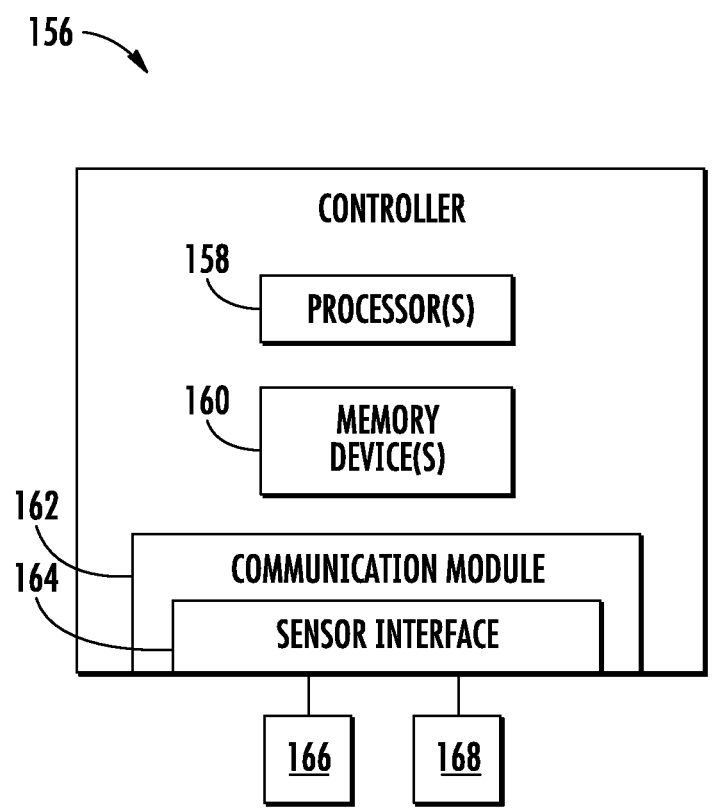
FIG. 5 illustrates a block diagram of one embodiment of a controller according to the present disclosure.

Referring now to FIG. 5, a block diagram of one embodiment of suitable components that may be included within the controller (such as any one of the converter controller 120, the turbine controller 26, and/or the farm-level controller 156 described herein) in accordance with example aspects of the present disclosure is illustrated. As shown, the controller may include one or more processor(s) 158, computer, or other suitable processing unit and associated memory device(s) 160 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 160 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 160 may generally be configured to store suitable computer-readable instructions that, when implemented by the processor(s) 158, configure the controller to perform various functions as described herein. Additionally, the controller may also include a communications interface 162 to facilitate communications between the controller and the various components of the wind turbine power system 100. An interface can include one or more circuits, terminals, pins, contacts, conductors, or other components for sending and receiving control signals. Moreover, the controller may include a sensor interface 164 (e.g., one or more analog-to-digital converters) to permit signals transmitted from the sensors 166, 168 to be converted into signals that can be understood and processed by the processor(s) 158.

Figure 6:
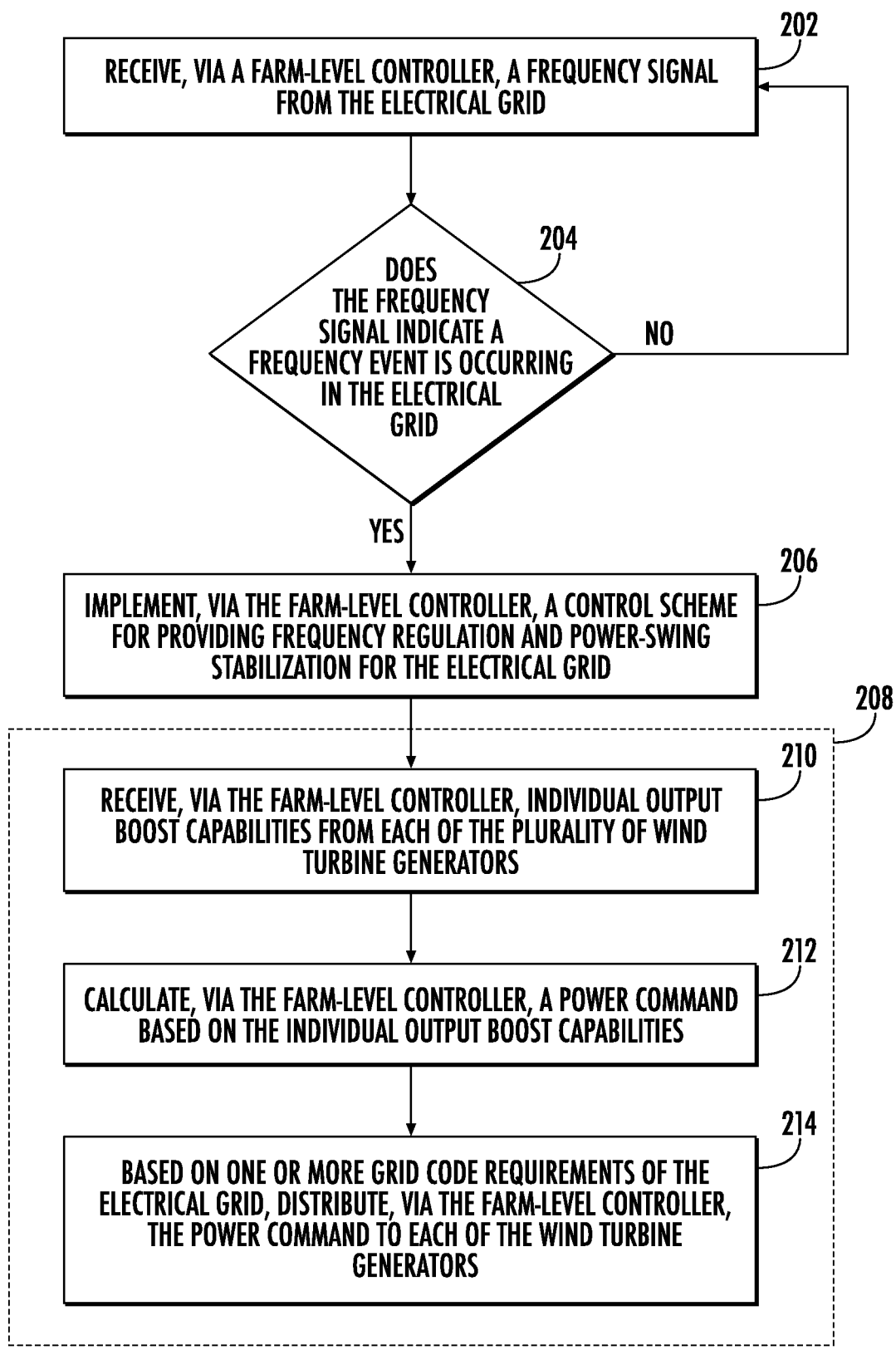
FIG. 6 illustrates a flow diagram of one embodiment of a method for controlling a wind farm connected to an electrical grid according to the present disclosure.

Referring now to FIG. 6, a flow chart of one embodiment of a method 200 for controlling a wind farm connected to an electrical grid, such as the wind farm 150 described herein, is illustrated. In general, the method 200 is described herein with reference to the wind turbine power system 100, the wind farm 150, and the controllers 26, 120, 156 of FIGS. 1-5. However, it should be appreciated that the disclosed method 200 may be implemented with wind turbines having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include receiving, via the farm-level controller 156, a frequency signal from the electrical grid 138 e.g. that represents the grid frequency and/or phase. For example, in one embodiment, the frequency signal may be measured via a sensor and/or may be determined or otherwise estimated by the farm-level controller.

As shown at decision block (204), the method 200 may include determining whether the frequency signal is indicative of a frequency event occurring in the electrical grid 138. As used herein, a frequency event may generally refer to an increase or decrease in grid frequency, including sudden and long-term changes, that requires the wind farm 150 to actively control its power output and participate in frequency regulation of the grid 138. In certain instances, the frequency signal may be compared to a minimum threshold or a maximum threshold, either predetermined or updated during operation, that allows the farm-level controller 156 to determine whether the increase or decrease is of a sufficient magnitude to represent a frequency event.

Still referring to FIG. 6, as shown at (206), the method 200 may include implementing, via the farm-level controller 156, a control scheme 208 for providing frequency regulation and power-swing stabilization for the electrical grid 138. For example, as shown at (210), the control scheme 208 may include receiving, via the farm-level controller 156, individual output boost capabilities from each of the plurality of wind turbine generators 24. In particular embodiments, the control scheme 208 may include instructing, via the farm-level controller 156, one or more of the plurality of wind turbine generators 24 to determine their respective individual output boost capabilities. Some of the wind turbine generators 24 within the wind farm 150 may not have a boost capability. In general, each turbine is configured to determine its available power "boost" capability based on its operating conditions, including without limitation, wind speed, turbine availability, rotor speed, generator speed, actual power, power margin, torque margin, speed margin, or functions thereof. The farm-level controller 156 may also provide the duration for which the "boost" can be provided.

Having received the individual boost capabilities from each wind turbine generator 24, as shown at (212), the control scheme 208 may include calculating, via the farm-level controller 156, a power command based on the individual output boost capabilities from the wind turbine generators 24. Furthermore, based on one or more grid code requirements of the electrical grid 138, as shown at (214), the control scheme 208 may also include distributing, via the farm-level controller 156, the power command to each of the wind turbine generators 24.

In a particular embodiment, for example, the farm-level controller 156 may include a ramp block for distributing the power command to each of the wind turbine generators 24. As such, the farm-level controller 156 is configured to intelligently decide how to achieve, at least as much as possible, the desired farm power output. In additional embodiments, for example, the farm-level controller 156 may add the power command to an actual power of the wind farm 150 at a start of the frequency event or continuously to a curtailed power of the wind farm 150 so as to allow for combined power responses.

In certain embodiments, for example, the power command may include increasing the power of one or more of the wind turbine generators 24, adjusting a power ramp up time or rate of one or more of the wind turbine generators 24, adjusting a power hold time of one or more of the wind turbine generators 24, and/or adjusting a power ramp down time or rate of one or more of the wind turbine generators 24.

For example, based on the individual output boost capabilities, the farm-level controller 156 may command selected ones of the individual turbine generators 24 to boost their individual outputs to any desired set point between a normal, i.e., no boost, level up to their maximum reported capability and any desired set point there between. In accordance with the present technology, a single one, a small number, or all of the turbines having boost capability may be commanded to boost their individual outputs to individually set, possibly different, set points in order to try to achieve the desired wind farm output. Operational adjustments of the plurality of wind turbine generators 24 may be conducted via communications means, which, in a manner similar to communications means 157, may correspond to any of line, fiber optic, or wireless communications means.

In additional embodiments, the farm-level controller 156 may also ensure that a maximum power limit for the wind farm 150 is not exceeded. For example, in such embodiments, the farm-level controller 156 may ensure the maximum power limit for the wind farm 150 is not exceeded by determining a minimum value between a power reference and a possible power for the wind farm 150. The farm-level controller 156 may then determine a difference between the minimum value and the maximum power limit for the wind farm 150, e.g. via subtracting, to determine a power margin. Accordingly, the farm-level controller 156 may then apply the power margin to the power command.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

Various aspects and embodiments of the present invention are defined by the following numbered clauses:

Clause 1. A method for controlling a wind farm connected to an electrical grid, the wind farm comprising a plurality of wind turbine generators at least some having output boosting capabilities, the method comprising:

receiving, via a farm-level controller, a frequency signal from the electrical grid;

if the frequency signal is indicative of a frequency event occurring in the electrical grid, implementing, via the farm-level controller, a control scheme for providing frequency regulation and power-swing stabilization for the electrical grid, the control scheme comprising:

receiving, via the farm-level controller, individual output boost capabilities from at least two of the plurality of wind turbine generators;

calculating, via the farm-level controller, a power command based on the individual output boost capabilities; and, distributing, via the farm-level controller, the power command to each of the wind turbine generators.

Clause 2. The method of clause 1, wherein the control scheme further comprises instructing, via the farm-level controller, one or more of the plurality of wind turbine generators to determine their respective individual output boost capabilities.

Clause 3. The method of any of the preceding clauses, wherein the one or more of the plurality of wind turbine generators determine their respective individual output boost capabilities based on at least one of rotor speed, generator speed, wind speed, actual power, power margin, torque margin, speed margin, or functions thereof.

Clause 4. The method of any of the preceding clauses, wherein the frequency event comprises the frequency signal being below a predetermined threshold.

Clause 5. The method of any of the preceding clauses, wherein the power command comprises at least one of increasing the power of one or more of the wind turbine generators, adjusting a power ramp up time or rate of one or more of the wind turbine generators, adjusting a power hold time of one or more of the wind turbine generators, or adjusting a power ramp down time or rate of one or more of the wind turbine generators.

Clause 6. The method of any of the preceding clauses, wherein the control scheme further comprises ensuring, via the farm-level controller, a maximum power limit for the wind farm is not exceeded.

Clause 7. The method of any of the preceding clauses, wherein ensuring the maximum power limit for the wind farm is not exceeded further comprises:
determining a minimum value between a power reference and a possible power for the wind farm;
subtracting the minimum value from the maximum power limit for the wind farm to determine a power margin; and,
applying, via the farm-level controller, the power margin to the power command.

Clause 8. The method of any of the preceding clauses, wherein distributing the power command to each of the wind turbine generators further comprises distributing, via a ramp block of the farm-level controller, the power command to each of the wind turbine generators.

Clause 9. The method of any of the preceding clauses, wherein distributing, via the farm-level controller, the power command to each of the wind turbine generators further comprises adding the power command to an actual power of the wind farm at a start of the frequency event or continuously to a curtailed power of the wind farm so as to allow for combined power responses.

Clause 10. The method of any of the preceding clauses, wherein distributing, via the farm-level controller, the power command to each of the wind turbine generators further comprises commanding selected ones of the plurality of wind turbine generators to boost their output to a desired level within their respective individual output boost capabilities.

Clause 11. A wind farm for connecting to an electrical grid, comprising:
a plurality of wind turbine generators, at least some of the generators having output boosting capabilities, each generator having a power output providing a portion of a wind farm power output;
a plurality of turbine controllers, each of the turbine controllers associated with a respective wind turbine generator of the plurality of wind turbine generators; and,
a farm-level controller communicatively coupled to each of the turbine controllers, the farm-lever controller configured to perform a plurality of operations, the plurality of operations comprising:
receiving the frequency signal from the electrical grid;
if the frequency signal is indicative of a frequency event occurring in the electrical grid, implementing a control scheme for providing frequency regulation and power-swing stabilization for the electrical grid, the control scheme comprising:
receiving individual output boost capabilities from each of the plurality of wind turbine generators;
calculating a power command based on the individual output boost capabilities; and,
distributing the power command to each of the wind turbine generators.

Clause 12. The system of clause 11, wherein the control scheme further comprises instructing one or more of the plurality of wind turbine generators to determine their respective individual output boost capabilities.

Clause 13. The system of clause 12, wherein the one or more of the plurality of wind turbine generators determine their respective individual output boost capabilities based on at least one of rotor speed, generator speed, wind speed, actual power, power margin, torque margin, speed margin, or functions thereof.

Clause 14. The system of clauses 11-13, wherein the frequency event comprises the frequency signal being below a predetermined threshold.

Clause 15. The system of clauses 11-14, wherein the power command comprises at least one of increasing the power of one or more of the wind turbine generators, adjusting a power ramp up time or rate of one or more of the wind turbine generators, adjusting a power hold time of one or more of the wind turbine generators, or adjusting a power ramp down time or rate of one or more of the wind turbine generators.

Clause 16. The system of clauses 11-15, wherein the control scheme further comprises ensuring a maximum power limit for the wind farm is not exceeded.

Clause 17. The system of clause 16, wherein ensuring the maximum power limit for the wind farm is not exceeded further comprises:
determining a minimum value between a power reference and a possible power for the wind farm;
subtracting the minimum value from the maximum power limit for the wind farm to determine a power margin; and,
applying power margin to the power command.

Clause 18. The system of clauses 11-17, wherein the farm-level controller further comprises a ramp block for distributing the power command to each of the wind turbine generators.

Clause 19. The system of clauses 11-18, wherein distributing the power command to each of the wind turbine generators further comprises adding the power command to an actual power of the wind farm at a start of the frequency event or continuously to a curtailed power of the wind farm so as to allow for combined power responses.

Clause 20. The system of clauses 11-19, wherein distributing the power command to each of the wind turbine generators further comprises commanding selected ones of the plurality of wind turbine generators to boost their output to a desired level within their respective individual output boost capabilities.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind farm connected to an electrical grid, the wind farm comprising a plurality of wind turbine generators at least some having output boosting capabilities, the method comprising:
   receiving, via a farm-level controller, a frequency signal from the electrical grid;
   when the frequency signal is indicative of a frequency event occurring in the electrical grid, implementing, via the farm-level controller, a control scheme for providing frequency regulation and power-swing stabilization for the electrical grid, the control scheme comprising:
      instructing, via the farm-level controller, at least two of the plurality of wind turbine generators to determine their respective individual output boost capabilities based on at least one of rotor speed, generator speed, wind speed, actual power, power margin, torque margin, speed margin, or functions thereof;
      receiving, via the farm-level controller, the individual output boost capabilities from the at least two of the plurality of wind turbine generators;
      calculating, via the farm-level controller, a power command based on the individual output boost capabilities; and,
      distributing, via the farm-level controller, the power command to each of the wind turbine generators.

2. The method of claim 1, wherein the frequency event comprises the frequency signal being below a predetermined threshold.

3. The method of claim 1, wherein the power command comprises at least one of increasing the power of one or more of the wind turbine generators, adjusting a power ramp up time or rate of one or more of the wind turbine generators, adjusting a power hold time of one or more of the wind turbine generators, or adjusting a power ramp down time or rate of one or more of the wind turbine generators.

4. The method of claim 1, wherein the control scheme further comprises ensuring, via the farm-level controller, a maximum power limit for the wind farm is not exceeded.

5. The method of claim 4, wherein ensuring the maximum power limit for the wind farm is not exceeded further comprises:
   determining a minimum value between a power reference and a possible power for the wind farm;
   subtracting the minimum value from the maximum power limit for the wind farm to determine a power margin; and,
   applying, via the farm-level controller, the power margin to the power command.

6. The method of claim 1, wherein distributing the power command to each of the wind turbine generators further comprises distributing, via a ramp block of the farm-level controller, the power command to each of the wind turbine generators.

7. The method of claim 1, wherein distributing, via the farm-level controller, the power command to each of the wind turbine generators further comprises adding the power command to an actual power of the wind farm at a start of the frequency event or continuously to a curtailed power of the wind farm so as to allow for combined power responses.

8. The method of claim 1, wherein distributing, via the farm-level controller, the power command to each of the wind turbine generators further comprises commanding selected ones of the plurality of wind turbine generators to boost their output to a desired level within their respective individual output boost capabilities.

9. A wind farm for connecting to an electrical grid, comprising:
   a plurality of wind turbine generators, at least some of the generators having output boosting capabilities, each generator having a power output providing a portion of a wind farm power output;
   a plurality of turbine controllers, each of the turbine controllers associated with a respective wind turbine generator of the plurality of wind turbine generators; and,
   a farm-level controller communicatively coupled to each of the turbine controllers, the farm-lever controller configured to perform a plurality of operations, the plurality of operations comprising:
      receiving the frequency signal from the electrical grid;
      if the frequency signal is indicative of a frequency event occurring in the electrical grid, implementing a control scheme for providing frequency regulation and power-swing stabilization for the electrical grid, the control scheme comprising:
         instructing at least two of the plurality of wind turbine generators to determine their respective individual output boost capabilities based on at least one of rotor speed, generator speed, wind speed, actual power, power margin, torque margin, speed margin, or functions thereof;
         receiving the individual output boost capabilities from each of the plurality of wind turbine generators;
         calculating a power command based on the individual output boost capabilities; and,
         distributing the power command to each of the wind turbine generators.

10. The system of claim 9, wherein the frequency event comprises the frequency signal being below a predetermined threshold.

11. The system of claim 9, wherein the power command comprises at least one of increasing the power of one or more of the wind turbine generators, adjusting a power ramp up time or rate of one or more of the wind turbine generators, adjusting a power hold time of one or more of the wind turbine generators, or adjusting a power ramp down time or rate of one or more of the wind turbine generators.

12. The system of claim 9, wherein the control scheme further comprises ensuring a maximum power limit for the wind farm is not exceeded.

13. The system of claim 12, wherein ensuring the maximum power limit for the wind farm is not exceeded further comprises:
   determining a minimum value between a power reference and a possible power for the wind farm;
   subtracting the minimum value from the maximum power limit for the wind farm to determine a power margin; and,
   applying power margin to the power command.

14. The system of claim 9, wherein the farm-level controller further comprises a ramp block for distributing the power command to each of the wind turbine generators.

15. The system of claim 9, wherein distributing the power command to each of the wind turbine generators further comprises adding the power command to an actual power of the wind farm at a start of the frequency event or continuously to a curtailed power of the wind farm so as to allow for combined power responses.

16. The system of claim 9, wherein distributing the power command to each of the wind turbine generators further comprises commanding selected ones of the plurality of wind turbine generators to boost their output to a desired level within their respective individual output boost capabilities.

* * * * *